US012572647B2

(12) United States Patent (10) Patent No.: US 12,572,647 B2
Darby et al. (45) Date of Patent: Mar. 10, 2026

(54) CONNECTING ADVERSARIAL ATTACKS TO NEURAL NETWORK TOPOGRAPHY

(71) Applicant: Battelle Memorial Institute, Columbus, OH (US)

(72) Inventors: Nicholas W. Darby, Columbus, OH (US); David Collins, Columbus, OH (US); Jeremy Bellay, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 282 days.

(21) Appl. No.: 17/912,782

(22) PCT Filed: Mar. 18, 2021

(86) PCT No.: PCT/US2021/022985
§ 371 (c)(1),
(2) Date: Sep. 19, 2022

(87) PCT Pub. No.: WO2021/188807
PCT Pub. Date: Sep. 23, 2021

(65) Prior Publication Data
US 2023/0145002 A1 May 11, 2023

Related U.S. Application Data

(60) Provisional application No. 62/991,466, filed on Mar. 18, 2020.

(51) Int. Cl.
*G06F 21/55* (2013.01)
*G06F 18/20* (2023.01)
(Continued)

(52) U.S. Cl.
CPC ............ *G06F 21/55* (2013.01); *G06F 18/217* (2023.01); *G06F 18/22* (2023.01); *G06F 18/285* (2023.01); *G06N 3/08* (2013.01)

(58) Field of Classification Search
None
See application file for complete search history.

(56) References Cited

U.S. PATENT DOCUMENTS

2019/0147162 A1* 5/2019 Mejbah Ul Alam .. G06N 3/088
726/23
2020/0050945 A1* 2/2020 Chen ..................... G06F 18/214
(Continued)

OTHER PUBLICATIONS

Chacon, Henry et al.: "Deep Learning Poison Data Attack Detection" 2019 IEEE 31st International Conference on Tools with Artificial Intelligence (ICTAI), IEEE Nov. 4, 2019, pp. 971-978, XP033713839.
(Continued)

*Primary Examiner* — Joshua Joo
(74) *Attorney, Agent, or Firm* — Volpe Koenig

(57) ABSTRACT

Some implementations provide devices, systems and/or methods for quantifying vulnerability of an artificial neural network (ANN) to poisoning attacks. Some implementations provide devices, systems and/or methods for reducing vulnerability of an artificial neural network (ANN) to poisoning attacks. Some implementations provide devices, systems and/or methods for detecting poisoning attacks in an ANN. An ANN is trained to generate inferences based on a function.

6 Claims, 8 Drawing Sheets

(51) Int. Cl.

| | |
|---|---|
| *G06F 18/21* | (2023.01) |
| *G06F 18/22* | (2023.01) |
| *G06N 3/08* | (2023.01) |

(56) References Cited

U.S. PATENT DOCUMENTS

| | | | | |
|---|---|---|---|---|
| 2020/0380338 A1* | 12/2020 | Matsumura | .............. | G06F 18/22 |
| 2021/0081831 A1* | 3/2021 | Angel | ..................... | G06N 20/00 |
| 2021/0203678 A1* | 7/2021 | Alagar | ..................... | H04L 67/02 |
| 2022/0050928 A1* | 2/2022 | Shukla | ................... | G06N 20/00 |
| 2022/0303286 A1* | 9/2022 | Karam | ................... | G06N 3/086 |

OTHER PUBLICATIONS

He Zhezhi et al: "Parametric Noise Injection: Trainable Randomness to Improve Deep Neural Network Robustness Against Adversarial Attack" 2019 IEEE/CVF Conference on Computer Vision and Pattern Recognition (CVPR), IEEE Jun. 15, 2019, pp. 588-597, XP033687272.

Goodfellow, Ian J. et al.: "Explaining and Harnessing Adversarial Examples" CLR 2015 (pp. 1-11) URL http://arxiv.org/abs/1412.6572.

Shokri, Reza et al.: "Membership Inference Attacks Against Machine Learning Models" IEEE, 2016 (pp. 1-16) URL http://arxiv.org/abs/1610.05820.

Shafahi, Ali et al.: "Poison Frogs! Targeted Clean-Label Poisoning Attacks on Neural Networks" 32nd Conference on Neural Information Processing Systems (NIPS, 2018), Montreal, Canada (pp. 1-18) URL http://arxiv.org/abs/1804.00792.

Defense Innovation Board: "AI Principles: Recommendations on the Ethical Use of Artificial Intelligence by the Department of Defense" 2019 (pp. 1-11) URL https://media.defense.gov/2019/Oct/31/2002204458/-1/-1/0/DIB_AI_PRINCIPLES_PRIMARY_DOCUMENT.PDF.

International Search Report, PCT/US2021/022985 dated Jul. 13, 2021 (2 pgs.).

* cited by examiner

Train ANN to Generate Inferences Based on a Function f(x) -> y — 202

Enumerate Points of Interest — 204

Generate Random Vectors — 206

Generate Patterns in ANN Output Based on Vectors — 208

Determine Mean Score of Outputs for Each Point of Interest — 210

Identify Vulnerabilities Based on Mean Scores — 212

400

Train ANN to Generate Inferences Based on a Function f(x) -> y — 402

Enumerate Points of Interest — 404

Generate Random Vectors — 406

Generate Patterns in ANN Output Based on Vectors — 408

Sort Points of Interest by v_length — 410

Identify Discontinuities in Sorted Points of Interest — 412

Compare Discontinuities with Corpus of Models to Determine Likelihood of Poisoning — 414

500

CONNECTING ADVERSARIAL ATTACKS TO NEURAL NETWORK TOPOGRAPHY

CROSS REFERENCE TO RELATED APPLICATIONS

The present application is a U.S. National Stage of International Application No. PCT/US2021/022985 filed on Mar. 18, 2021, which claims the benefit of U.S. Provisional Application No. 62/991,466, filed Mar. 18, 2020, the contents of all of which are incorporated by reference as if fully set forth.

FIELD OF INVENTION

The invention relates to artificial intelligence, and in particular, to detecting and mitigating vulnerabilities in artificial neural networks.

BACKGROUND

Artificial intelligence (AI) technologies, such as artificial neural networks (ANNs) play an increasingly important role in mission critical systems, recognizing threatening objects, behaviors, and patterns. However, the inclusion of AI also creates new attack surfaces for subverting these systems.

ANNs are vulnerable to small input perturbations that cause large changes in output. This may be exploited by malicious actors to undermine decision making systems. Adversarial attacks utilize crafted inputs to exploit neural architectures by inducing inference errors or leaking model information. Attacks in which malicious training data is used to induce unexpected runtime behavior may be referred to as poisoning attacks.

SUMMARY

Some implementations provide devices, systems and/or methods for quantifying vulnerability of an ANN to attacks. An ANN is trained to generate inferences based on a function. A number of points of interest are identified in an input space of the ANN. A random unit vector is generated for each of the points of interest. A pattern is generated for each point of interest using the trained ANN by, for each point of interest: generating a first inference as a function of the corresponding point of interest, generating a second inference as a function of the corresponding point of interest plus the unit vector, and generating a third inference as a function of the corresponding point of interest minus the unit vector. A first mean score of the first inferences, a second mean score based on the second inferences, and a third mean score based on the third inferences, are generated. A vulnerability of the ANN to attacks is determined based on the first mean score, the second mean score, and the third mean score.

Some implementations provide devices, systems and/or methods for reducing vulnerability of an ANN to attacks. An ANN topography is selected from among a plurality of ANN topographies. A topography metric is calculated, based on the ANN topography, during training of the ANN. A response surface of the ANN is regularized. A gradient of the ANN is shattered.

Some implementations provide devices, systems and/or methods for detecting attacks in an ANN. An ANN is trained to generate inferences based on a function. A number of points of interest are identified in an input space of the ANN. A random unit vector is generated for each of the points of interest. A pattern is generated for each point of interest using the trained ANN by, for each point of interest: generating a first inference as a function of the corresponding point of interest, generating a second inference as a function of the corresponding point of interest plus the unit vector, generating x_score, v_length, and v_delta for the point of interest based on the first and second inference. The points of interest are sorted by v_length. Discontinuities are identified in the sorted points of interest. The discontinuities are compared with a corpus of models to determine a likelihood that the identified discontinuities are from an attacked network. A determination of whether the ANN has been attacked based on the likelihood is output.

BRIEF DESCRIPTION OF THE DRAWING(S)

DETAILED DESCRIPTION OF THE PREFERRED EMBODIMENT(S)

Figure 1A:
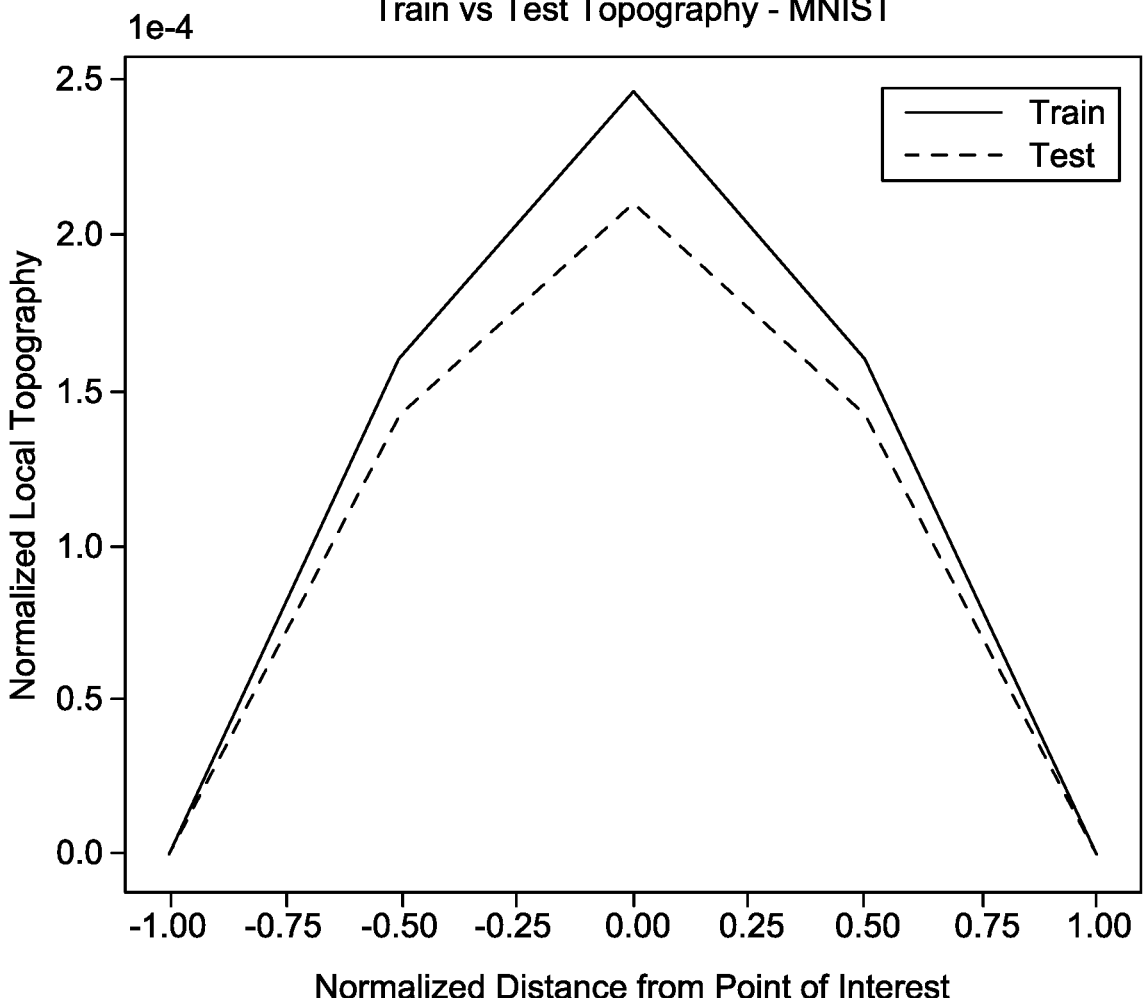
FIGS. 1a-1d are a plot which illustrates local topography around training, testing, and adversarial points.

ANN architectures used in machine learning (ML) may be susceptible to a wide range of vulnerabilities, raising concerns about their use in mission critical systems. Demonstrations of runtime vulnerabilities (i.e., vulnerabilities introduced during the operation of a trained ANN) have raised awareness of the misclassification and information leakage risks associated with uncontrolled, out of distribution inputs. However, vulnerabilities introduced at train time (i.e., during training of the ANN) by poisoning attacks (i.e., introduction of malicious training data during the training process) can also introduce dangerous, unexpected behavior even if the trained ANN is operated with "clean" inputs. Poisoning attacks are particularly threatening because they allow attackers to control the behavior of the system without the need to have control over the input or ongoing access to the system.

Further, in order to facilitate the ethical use of AI, it may be desired to design AI systems which are "governable". Understanding poisoning attacks may facilitate AI governance by detecting and avoiding unintended harm from compromised AI systems. Prior approaches to detecting attacks on neural networks are lacking, and there is no recognized framework for assessing attack risk and generating meaningful metrics to guide technical or non-technical decision makers. Without empirically or theoretically justified metrics, the task of defending AI systems from attacks falls on the ad hoc heuristics of engineers who may or may not understand the potential risks.

Accordingly, it may be desired to provide devices, systems, and methods for analyzing ANNs to determine their level of vulnerability to various kinds of attacks, for reducing the vulnerability of the ANNs to various kinds of attacks, to detect attacks on ANNs, and/or to generate trust metrics for ANNs.

Runtime vulnerabilities may exploit topographical properties of ANNs (e.g., local variation in the response surface of the ANN which can be referred to as "hills," "valleys," "saddle points," "gradient," etc.). Example categories of vulnerabilities that exploit topographical properties of otherwise well-behaved ANNs may be referred to as information leakage vulnerabilities, behavior subversion vulnerabilities, membership vulnerabilities, and training data reconstruction vulnerabilities. Information leakage attacks use crafted inputs to extract information about the network's training data (e.g., the gradient of the ANN, or a smooth approximation of the gradient) through the output vector. Inputs may be "crafted" in various ways, such as using a Fast Gradient Sign Method (FGSM). Behavior subversion attacks use crafted inputs to exploit errors in the neural network's approximation of the true mapping function to produce incorrect output vectors. Membership attacks and training data reconstruction attacks extract information about how the ANN was trained by inputting maliciously crafted input data. Behavior subversion involves attempts to get the ANN to malfunction, or perform worse at the task it was designed for. Training data reconstruction involves attempts to extract information about the training set that was used to train an ANN, such as whether a particular image was in the training set, or if any pictures of a particular subject were involved.

Various topographical features of ANN response surfaces may be used to facilitate information leakage and behavior subversion attacks. The response surface of the ANN may be represented as the n+m dimensional surface from plotting the ANN as a function from n-dimensional input space to m-dimensional output space. Any references to topography, hills, tents, divots, etc. are references to this surface. Example information leakage attacks may assume that inputs used for training will be assigned higher confidence scores (i.e., output values from an ANN used as a classifier) than the surrounding points. In this context, surrounding points are points that are nearby (e.g., within a desired threshold distance) in the n-dimensional input space. For example, for an image, surrounding points may be near-identical images, where the differences are only low level noise (e.g., noise below a desired threshold level). Accordingly, some implementations may assume that training points (where each training point is a single instance from the training set—in the case of an ANN trained on images, this may be a single image in the training set) are surrounded by tented local topography (i.e., a local maximum in the output space, where the confidence value at that point is higher than any nearby points, and getting further from the center results in further decrease—in 3-dimensions this may resemble a tent or a hill) that differentiates the training points from in-distribution test inputs that were not used during training. In this context, "in-distribution test inputs" refer to "real" inputs as distinguished from crafted inputs. Most "real" or non-crafted inputs may be expected to have particular qualities, even for noise, as compared to an idealized version of the input, such that the ANN may be trained only using values that have these qualities. If all of the "real" data has those qualities, it may be accepted as genuine by the ANN. Crafted inputs are able to succeed in deceiving the ANN by getting out of the space of data having these qualities. It may be assumed that adversarially crafted inputs are surrounded by divoted local topographies (i.e., local minima in the output space, where the confidence value at that point is lower than any nearby points, and getting further from the center results in further increase—in 3-dimensions this may resemble a divot or valley), as they may be designed to minimize output confidence score while staying within a limited input region (e.g., a region in the n-dimensional input space—e.g., images that look similar to a target image may be considered to be a region of the image input space).

In some implementations, the approach above may be expanded to apply to train time attacks, (i.e., poisoning), e.g., to develop trust metrics. In some implementations, the topography of poisoned neural networks may be analyzed for distinctive features (e.g., "fingers," "islands," "archipelagos," "doughnuts" etc.) that differentiate them from non-poisoned networks. In some cases, distinctive fingers may occur in the decision boundaries connecting "poisoned regions" to their core classes. In this context, a "finger" refers to an elongated, narrow region of the decision boundary. The boundary itself may otherwise be expected to be centralized or bulbous, but a poisoning attack may result in a small region that may otherwise not be included being attached to the decision boundary. Any connections between the big and small regions may be identifiably long and narrow (e.g., within a desired threshold amount of elongation and/or width). Placing a lower bound on the confidence score for a class in an ANN classifier may result in a split in the input space between "assumed in the class" and "assumed out of the class". "Decision boundary" may refer to the boundary between segments of the input space, analogous to an isocline on a topographical map. "Poisoned region" refers to the small region that may not be within the decision boundary without the presence of poisoned data. "Core class" refers to the larger central part of the decision boundary, which may exist with or without poisoned data.

Some implementations generate descriptive metrics and baseline profiles for poisoned and healthy networks, e.g., based on identified topographical features indicative of poisoning. This may have the advantage of providing diagnostic insight into the topographical properties of a given network and may allow supervisors to monitor for "slow poison"—i.e., a gradual introduction (e.g., anywhere between the point of data collection and use in training and ANN, to include physical manipulation of sensor devices, manipulation of data processing tools, or insertion of data into a processed data set) of poisoned training data by an adversary in the field.

In some implementations, this approach may be complemented by, or replaced by, a search for relatively small sets of training inputs that cause significant distortions in the ultimate decision boundary. "Small" sets of training inputs, in this context, may refer to the size of the training set relative to the size of the impact to the decision boundary. For example, it may be expected that half the decision boundary may be changed by removing half the data, but being able to change half the decision boundary with 1 percent of the data may be a noticeable outlier—a significant distortion caused by a small set of training inputs. "Ultimate decision boundary" in this context may refer to the final decision boundary after all training is completed, as opposed to one in the middle of training or with less than all of the data.

Such distortions may indicate inputs which may have been crafted to maximize their destructive impact. The various metrics and/or profiles described above may advantageously provide machine learning experts or non-technical decision makers with a description of the mathematical properties of a trained AI system. In some implementations, some or all of the metrics and/or profiles may be processed to provide a concise summary.

In some implementations, irregularities in the local topography of the output space around the mappings from training inputs, malicious inputs, and/or normal test inputs may be used to develop metrics to assess the vulnerability of neural networks to different kinds of attack, and to develop novel training strategies that reduce the topography available to attackers. Training inputs, in this context, are data used in the training process. Malicious inputs, in this context, are adversarially crafted data. Normal test inputs, in this context, are data drawn from the same sources as training data, but not used during training—normal text inputs are used to verify accuracy on unseen data. Topography around training inputs, malicious inputs, and test inputs are expected to be similar in typical cases. A function which quantifies these differences may be considered a metric of how different the topographies are, which may indicate vulnerability of the ANN to attacks.

Various implementations discussed herein extract and/or identify local topography of the ANN, and/or determine metrics based on local topography of the ANN, for the purpose of estimating vulnerability to train time and/or run time vulnerabilities." Analyzing aspects of the local topography of an ANN that guides train time (i.e., poisoning) attacks may have the advantage of facilitating assessment and mitigation of such attacks at the local topography level, e.g., as opposed to abstract approaches which may capture other signals. Prior approaches to detection and mitigation of neural vulnerabilities fail to explicitly acknowledge and target these variations in topography.

ANNs approximate a function by mapping input data to a classification space. In this context, "classification space" may refer to the output space of a classifier. For a set of classes, classification space may indicate a probability of an input being a member of each of the classes. Some implementations may analyze this process for vulnerabilities or compromise by stochastically exploring the classification region around points of interest.

Figure 1B:
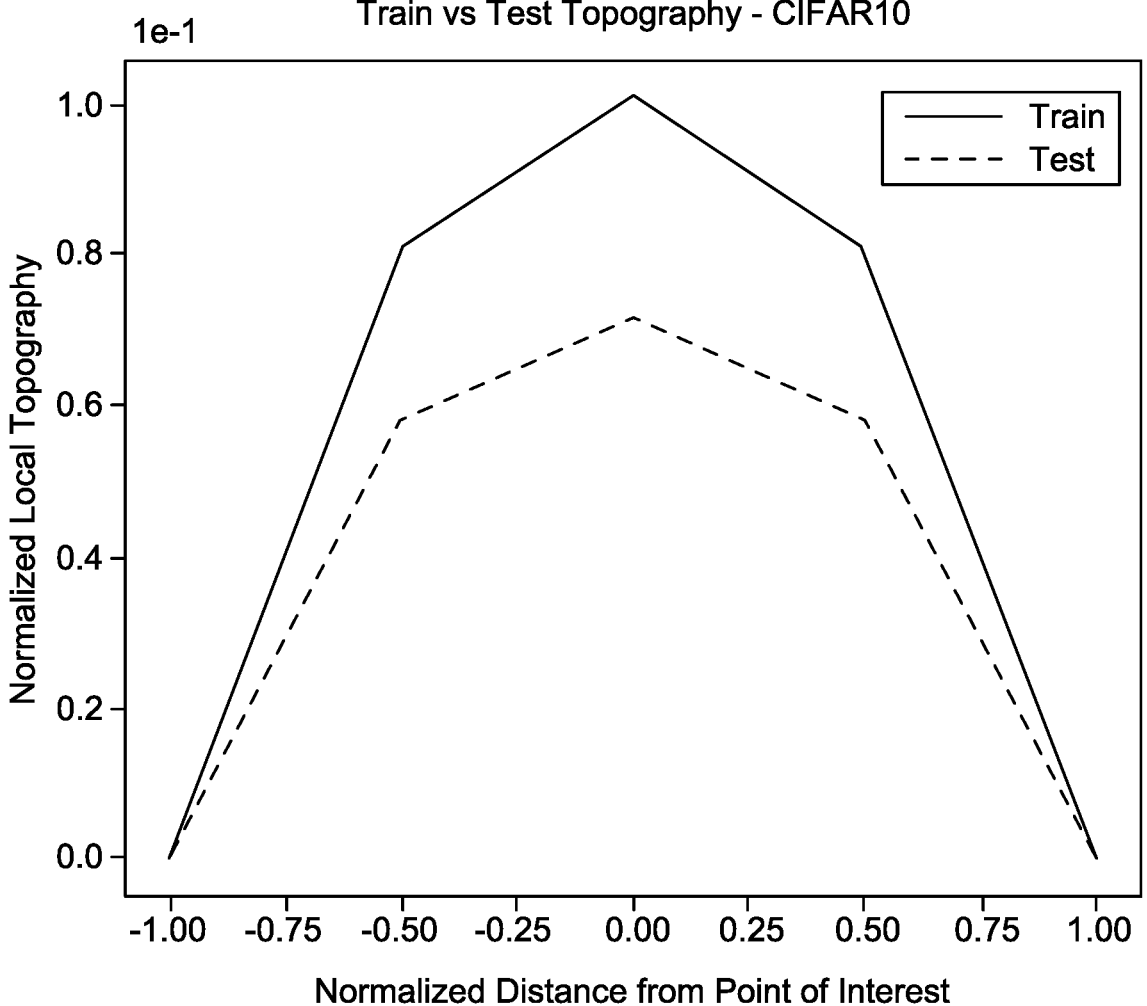
Figure 1C:
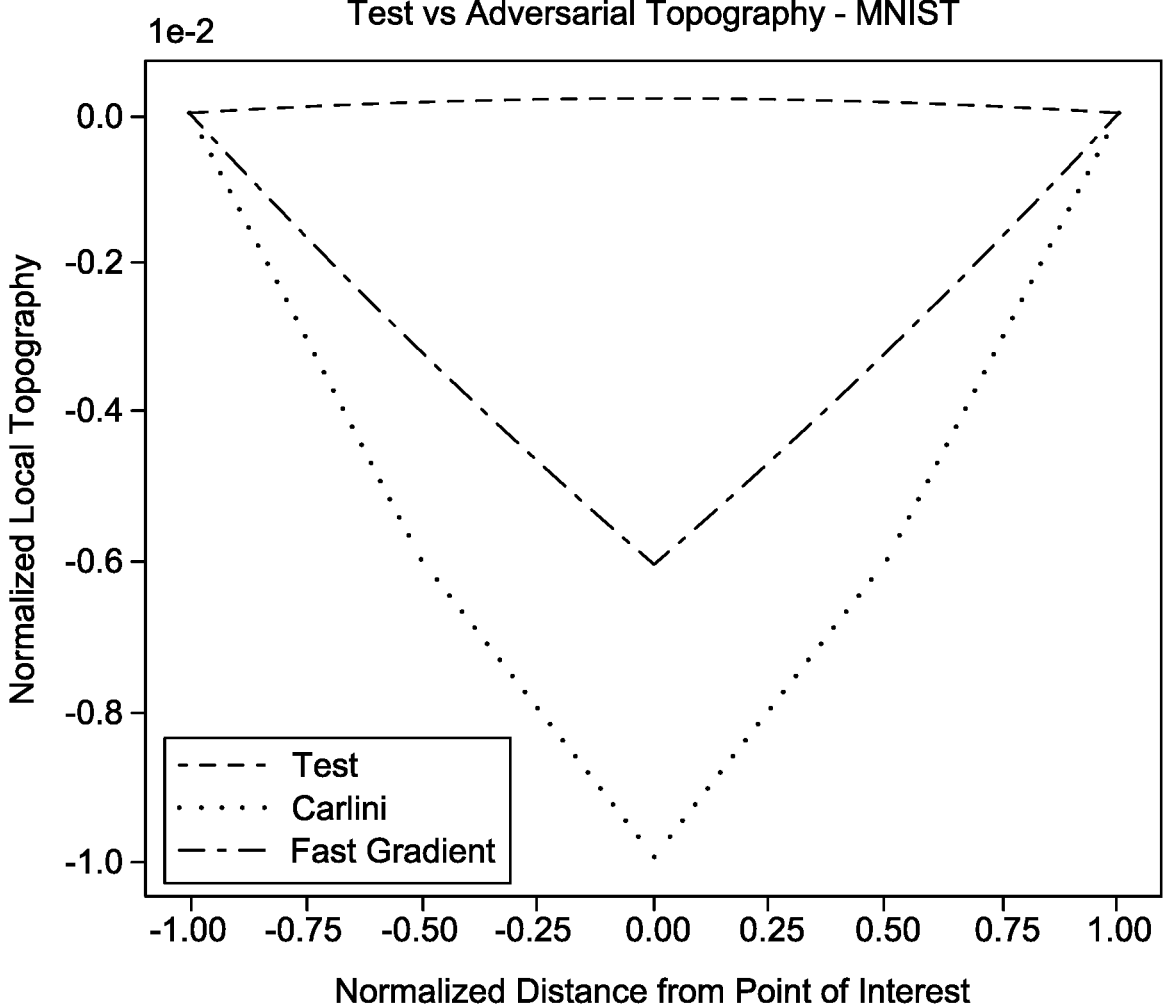
Figure 1D:
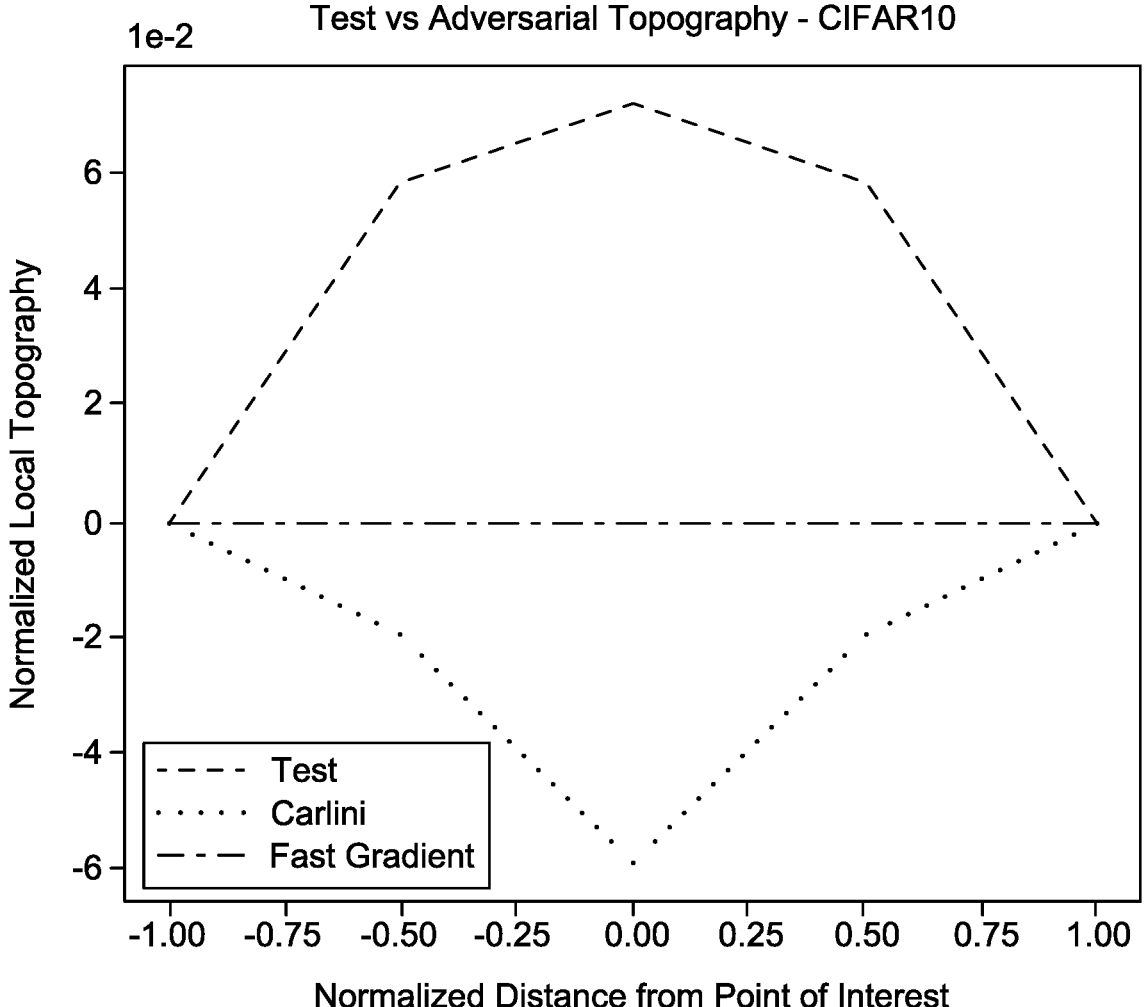

FIGS. 1a-1d are plots which illustrate local topography around training (solid black), testing (dashed line), and adversarial points (dotted line and). FIG. 1a and FIG. 1c illustrate data of a Modified National Institute of Standards and Technology (MNIST) dataset while FIG. 1b and FIG. 1d illustrate date of a Canadian Institute For Advanced Research (CIFAR-10) dataset. In FIGS. 1a-1d, the x-axis represents the normalize distance from a point of interest, while the y-axis represents the normalized local topography. As shown in FIGS. 1a-1d, training points have larger "confidence tents" than test points, and that adversarial points exist in deep "confidence divots."

ANNs "remember" training points by learning approximating functions that overestimate confidence on those points. In this context, a training point is a single input datum to the training process. The ANN learns the approximating functions in any suitable manner e.g., by inputting a training set and back-propagating a cost function. Adversarial techniques seek out points in a given region that underestimate confidence in the true class. FGSM is an example way an adversarial technique may seek such points. Such techniques typically use the gradient, or an approximation, to find small changes to the input that result in large changes to the confidence. In some instances, in the topography of an ANN, peaks in classification space around training points and divots around adversarial points. These structures are a natural result of errors in the approximation.

Some implementations may sample the local classification region by generating random vectors (e.g., a number of vectors based on the dimensionality of the input) crossing points of interest, and logging the observed confidences, e.g., as confidence values. In some implementations, the local topography of the ANN may be described using such confidence values.

The various techniques discussed herein are applicable to various ANN architectures (e.g., fully connected, convolutional, etc.), such as those used for image classification, and may include examining the ANN for test, train, and adversarial regions of the topography. Various strategies may be employed to explore the topography for different kinds of attacks, such as model inversion attacks and membership attacks.

In some implementations, population differences between test and train points may be identified. In some implementations, classifiers (i.e., functions designed to take points from an input set, and output a probability vector for a collection of possible classes) may be built to discriminate between individual adversarial and test points. Using information about the local topography in the ANN being protected as input, an additional ANN may be constructed to estimate whether the data that is being fed into the protected ANN has been adversarially crafted, or is from a similar data source to the training data. This may provide the advantage of filtering data expected to cause the protected ANN to fail.

Figure 2:
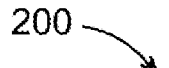
FIG. 2 is a flow chart illustrating an example process for assessing an ANN for vulnerability to different kinds of attacks.
Figure 2:
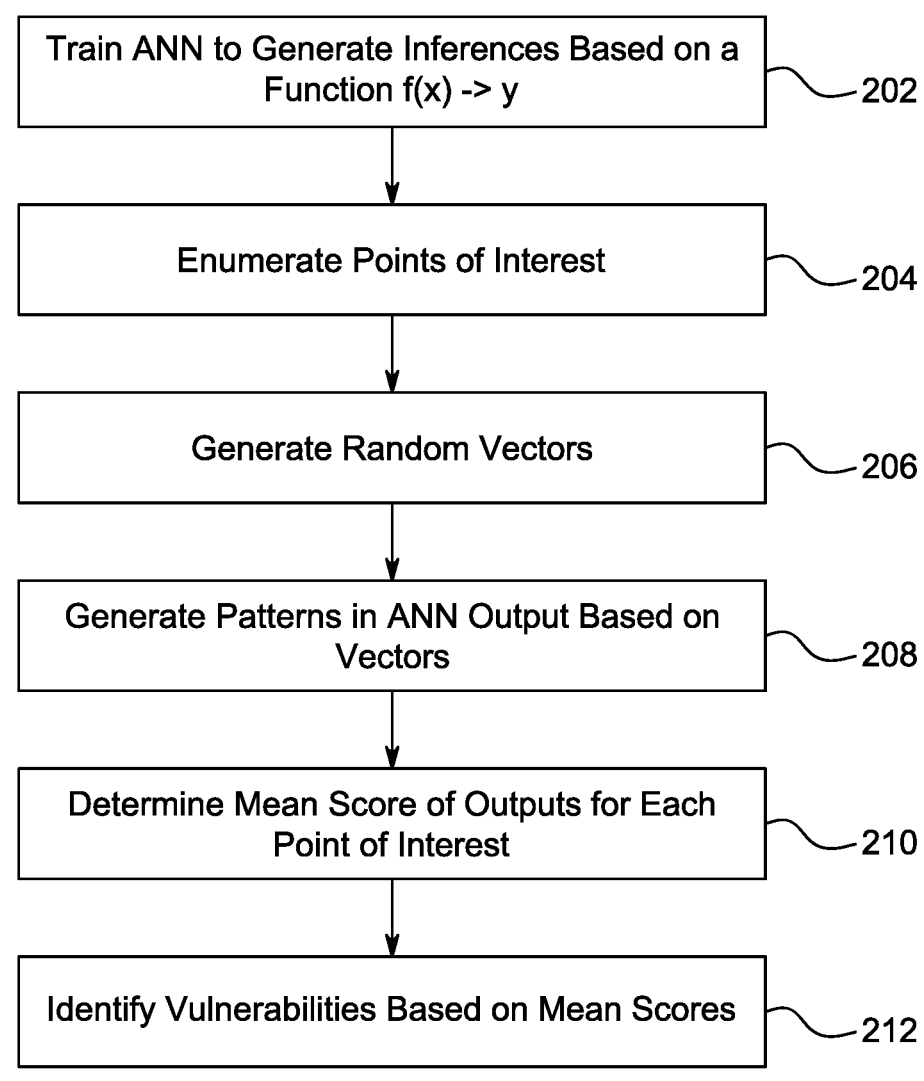

Some implementations assess an ANN for vulnerability to different kinds of attacks based on metrics associated with a topography of the ANN. FIG. 2 is a flow chart illustrating an example process 200 for assessing an ANN for vulnerability.

At 202 of the process 200, the ANN is trained to "generate a function f", which maps the input data to the desired output space (e.g. a set of classes) of the ANN, as f(x)→y. In this example, the ANN is trained on an image classification task, however in other implementations, the ANN may be trained on any suitable task. In an implementation, the input data may include data from sensors that capture data outside the ANN environment. Furthermore, the input data may come from imaging devices, such as long wave infrared, short wave infrared, visual light cameras, and x-ray.

At 204 of the process 200, a number, n, of points of interest in the input space are enumerated (e.g., identified and indexed), including training points, test points, and adversarially perturbed points, where training points are data used to train the classifier, test points are data held out from training used to assess the classifier, and adversarially perturbed points are data points added by the adversary.

At 206 of the process 200, n random unit vectors, v, are generated, each vector crossing one of the enumerated points of interest. Here, if the point of interest is x, the vectors that cross it would be (x, x+v) and (x, x−v). There is a single vector of length 2|v| that has the point of interest as it's midpoint.

At 208 of the process 200, for each of the n unit vectors v, the f(x), f(x+v), and f(x−v) are evaluated by the ANN, retaining score assigned to correct class, to generate n patterns in the output of the ANN that describe random local samples of the topography of the ANN. The classifier may output a vector of scores for each class.

Each pattern is a vector of three scalar values (i.e., the evaluated f(x), f(x+v), and f(x−v)). The relative magnitude of each of the scalar values in the vector, with respect to the others in the vector, may be used to characterize the local topography, e.g., "high-low-high", "low-low-high", "high-low-low", etc. Here, high-low-high may represent an adversarially crafted input, where small perturbations were used to find a local minimum. Low-low-low or high-high-high may indicate the expected smooth topography. Low-high-low may indicate that the point of interest will leak training data.

At 210 of the process 200, for each of the n points of interest, a mean (or in some implementations, median, mode, any percentile, or a multi-number composite summary) score of points on either side of the point of interest (i.e., f(x+v) and f(x−v) in this example) is determined.

At 212 of the process 200, the mean scores calculated at 210, are used to determine the vulnerability of the ANN to attacks. This determination may be outputted to a user via graphical user interface (GUI) or may be used in an automated control system. Further, the determination may be used by an industrial machine or industrial process, which then may use the determination to alter its behavior and/or settings. Potential determinations may include: rejecting a potentially perturbed part, declining to update its neural model to a potentially poisoned version, supplementing initial scans with additional investigation, logging a warning for users, or halting the process until a human can intervene.

In some implementations, the amount of topographical difference between the training points and testing points, as described by the mean scores for each, may be used as an indication of vulnerability of the ANN to information leakage attacks. The amount may be the difference between topographical metrics for the two classes of point. For example, the difference between the mean f(x)−f(x+v) for each group may be used as the amount in this example.

In some implementations, sharp, distinct, and/or anomalous changes in metrics (i.e., training points that have local topography that differs significantly from most of the other training points, e.g., those in the same class) as vector length is increased are considered to indicate potential poisoning of the training data. In some implementations, points that are surrounded by higher confidence regions are considered to indicate adversarial crafting, where aversarially crafted inputs may be inputs which began as natural inputs, and were then altered (e.g., slightly) with an adversarial attack algorithm. In some implementations, vector lengths may be modified (e.g., such that vectors of multiple lengths are used). In some implementations, the n random unit vectors, v, are generated, each passing near (e.g., within a desired and/or threshold distance) to, rather than crossing one of the enumerated points of interest. In some implementations, a vector of arbitrary length is generated, then a second vector perpendicular to that one. The midpoint of the second vector would be the endpoint of the first vector. This may allow for sampling more complex features of the local topography in some implementations. In some implementations, more sophisticated algorithms are used to analyze their implications. In some implementations, the techniques described above are applied to a derivative space, rather than the output space. For example, the topographical approach in this example approximates the derivative of the response surface at each point. Operating in derivative space may have the advantage of revealing additional, more sophisticated patterns.

Figure 3:
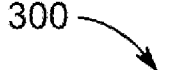
FIG. 3 is a flow chart illustrating an example process for modifying the training of an ANN to reduce the topography available to attackers.
Figure 3:
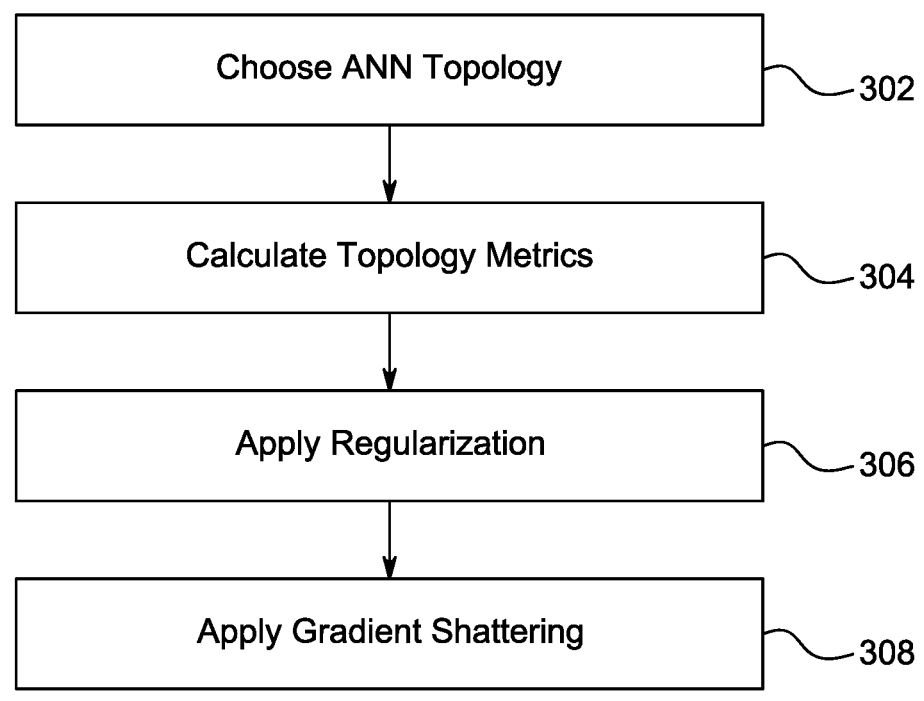

Some implementations reduce the topography available to attackers in an ANN. FIG. 3 is a flow chart illustrating an example process 300 for modifying the training of an ANN to be "topography aware" in order to reduce the topography available to attackers. FIG. 3 illustrates the process 300 in a particular example sequence, however it is noted that any one of, a subset of, or additional steps may be used to reduce the ANN topography available to attackers, and in any suitable order, in other examples.

At 302 of the process 300, an ANN topography is chosen, from among a plurality ANN topologies, which yields a cleaner response surface for the intended application than others of the plurality.

At 304 of the process 300, topography metrics are calculated during training. Such metrics may include the sum of the differences between f(x) and each f(x+v), the sum of the squared differences, the gradient evaluated at f(x), etc.

At 306 of the process 300, regularization is applied to smooth the response surface. In this example, regularization includes penalties in the loss function to improve generalization, for example, including the sum of the parameter values to encourage parameter minimization. In this case, the metric may be added to the loss during each training iteration to minimize surface roughness. Response surface, in this example, refers to the surface of possible outputs associated with legal inputs to the ANN.

At 308 of the process 300, gradient shattering is applied, e.g., to obfuscate the topography on the back end. Adversarial crafting attacks adjust the input using the gradient of the response surface to cause misclassifications. Gradient shattering defenses attempt to hide this gradient by, for example, rounding or adding noise to the response surface.

Figure 4:
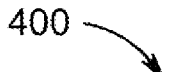
FIG. 4 is a flow chart illustrating an example process for detecting poisoning attacks and generating trust metrics.
Figure 4:
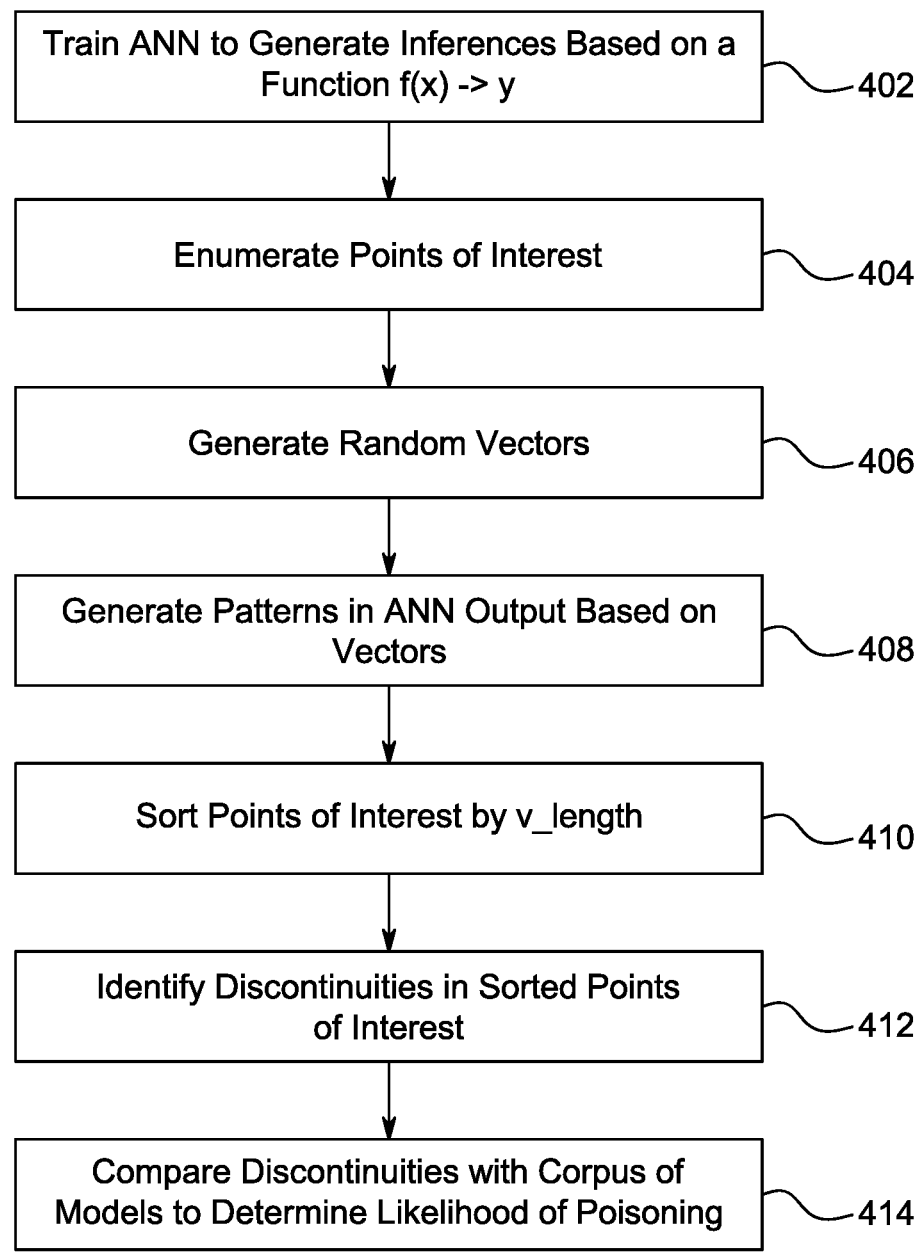

Some implementations detect attacks and generate trust metrics. FIG. 4 is a flow chart illustrating an example process 400 for detecting attacks and generating trust metrics.

At 402 of the process 400, the ANN is trained to generate inferences based on a function, f, which maps the input or inputs of the ANN to the output or outputs of the ANN, as f(x)→y. In this example, the ANN is trained on an image classification task, however in other implementations, the ANN may be trained on any suitable task.

At 404 of the process 400, a number, n, points of interest in the input space are enumerated. In this example, valid pictures in the training data are considered points of interest.

At 406 of the process 400, n, random vectors of varying length are generated. In some implementations, rather than random, the vectors are, pseudorandom or from a defined sampling scheme such as principal components of the input, or restricting them to a single dimension of the input.

At 408 of the process 400, for each of the n unit vectors v, the f(x) and f(x+v) are evaluated by the ANN, retaining score assigned to correct class, to generate n patterns in the output of the ANN that describe random local samples of the topography of the ANN. In this case, each pattern includes x_score, v_length, and v_delta for the point of interest. X_score is a score assigned to the correct class by the classifier for the unnoised point, v_length is the length of the noise vector used, and v_delta is the difference between the score for the correct class evaluated at the unoised and noised inputs. This example approach summarizes the local topography using just the output dimension associated with the correct class, and dropping the other values. This is not a requirement of the approach, but is used in this example for ease of illustration.

At 410 of the process 400, the points of interest are sorted by v_length. At 412 of the process 400, discontinuities (e.g., shifts in values that are more extreme than observed at most other points, e.g., by a desired and/or threshold amount) in the sorted points of interest are identified.

At 414 of the process 400, the identified discontinuities are compared with discontinuities in a corpus of models to determine the likelihood that the identified discontinuities are from a poisoned or leaky network, or if they are from adversarially grafted points.

The determination of the likelihood of poisoning at 414 of the process 400 may be outputted to a user via graphical user interface (GUI) or may be used in an automated control system. Further, the determination may be used by an industrial machine or industrial process, which then may use the determination to alter its behavior and/or settings. Potential determinations may include: rejecting a potentially perturbed part, declining to update its neural model to a potentially poisoned version, supplementing initial scans with additional investigation, logging a warning for users, or halting the process until a human can intervene.

Figure 5:
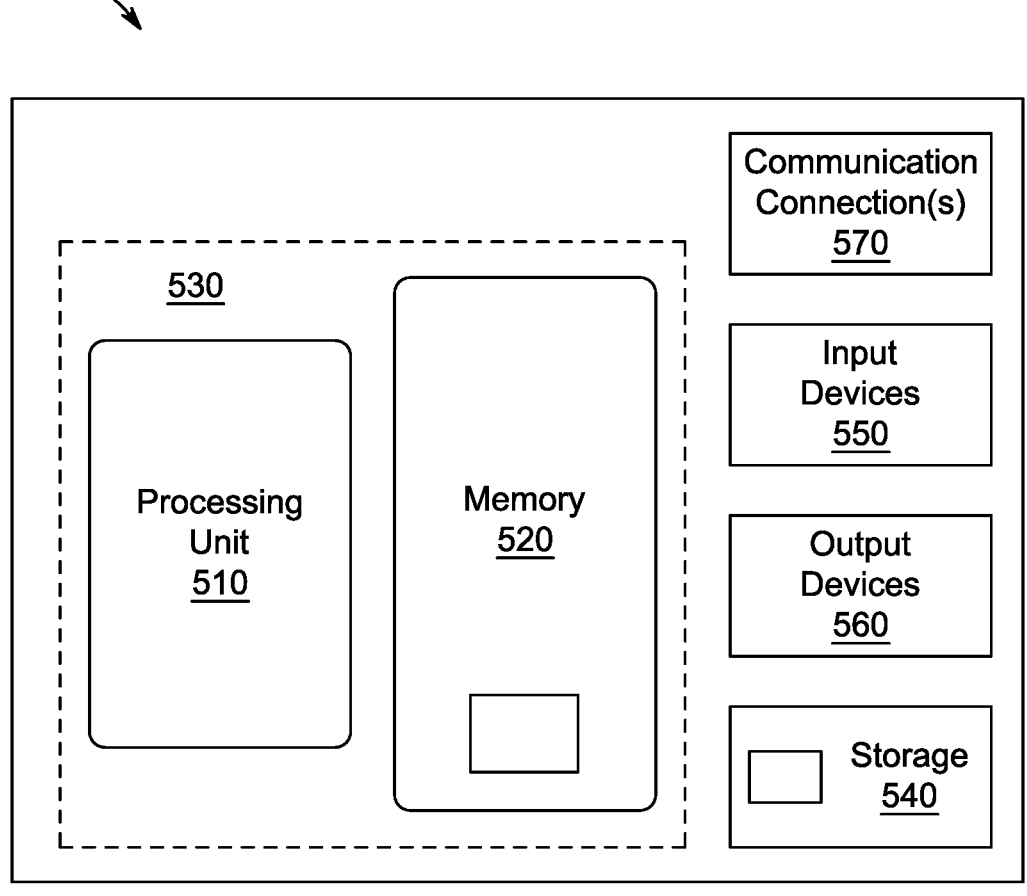
FIG. 5 is a block diagram which illustrates an example computing system for implementing the various example implementations discussed herein.

FIG. 5 is a block diagram which illustrates an example computing system 500, some or all of which is suitable for implementing the various example implementations discussed herein. Computing system 500 is not intended to suggest any limitation as to the scope of use or functionality of the disclosed technology, as the techniques and tools described herein may be implemented in diverse general-purpose or special-purpose environments that have computing hardware.

Computing system 500 includes at least one processing unit 510 and memory 520. In FIG. 5, computing device 530 includes processing unit 510 and memory 520. Processing unit 510 may include any suitable general-purpose computer processing unit (CPU), graphics processing unit (GPU) or any other suitable specialized or general-purpose computer processor or combination of processors configured to execute computer-executable instructions. In a multi-processing system, multiple processing units execute computer executable instructions to increase processing power. Memory 520 may include any suitable memory hardware, such as volatile memory (e.g., registers, cache, RAM), non-volatile memory (e.g., ROM, EEPROM, flash memory), or a combination of volatile and non-volatile memory. Memory 520 stores instructions 580 for implementing one or more of the described techniques for operating or using the disclosed systems. For example, the memory 520 may store instructions for implementing any of the disclosed techniques, such as instructions for implementing an ANN, for any of the interactions with and/or processing of the ANN, its input data (training, testing, or otherwise) and/or its output data, and/or for identifying vulnerabilities in the ANN.

Computing device 530 may include additional features. For example, the example computing system 500 may include storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 may be removable or non-removable, and may include magnetic disks, magnetic tapes or cassettes, CD-ROMs, DVDs, or any other tangible storage medium which may be used to store information in a non-transitory manner and which may be accessed within the computing environment 500. The storage 540 may also store instructions for the software 580 implementing any of the described techniques, systems, or environments.

The input device(s) 550 may be a touch input device such as a keyboard, mouse, touch screen, pen, or trackball, a voice input device, a scanning device, or another device that provides input to the computing environment 500. The output device(s) 560 may be a display, touch screen, printer, speaker, or another device that provides output from the computing environment 500.

The communication connection(s) 570 enable communication over a communication medium to another computing entity. The communication medium conveys information such as computer-executable instructions, an agent transport payload, or other data. The information may be conveyed, e.g., in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The various methods, systems, and interfaces disclosed herein may be described in the general context of computer-executable instructions stored on one or more non-transitory computer-readable media. Non-transitory computer-readable media may include any suitable media that may be accessed within or by a computing environment, excluding transitory carrier waves. By way of example, and not limitation, in example computing system 500, non-transitory computer-readable media may include tangible non-transitory computer-readable media, such as memory 520 and storage 540.

The various methods, systems, and interfaces disclosed herein may also be described in the general context of computer-executable instructions, such as those being executed in a computing environment on a target processor. Generally, program such instructions may include routines, programs, libraries, objects, classes, components, data structures, and the like that perform particular tasks or implement particular abstract data types. The functionality of the program modules may be combined or split between program modules as desired in various embodiments. Computer-executable instructions for program modules may be executed within a local or distributed computing environment.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be mask works that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computer-implemented method for detecting poisoning attacks in a trained artificial neural network (ANN) executing on a computing device comprising a processor and memory, the method comprising:

(a) access the ANN configured to generate inferences based on input data;

(b) selecting, from an input dataset stored in memory, a plurality of data points representing inputs to the ANN;

(c) for each of the selected data point, generating a random unit vector using a pseudorandom number generator and store the unit vector in memory;

(d) for each data point:

(i) computing a first inference output by applying the data point to the ANN;

(ii) computing a second inference by applying a perturbed version of the data point, formed by adding corresponding unit vector to the ANN;

(iii) calculating, using the first and second inference outputs, a set of ANN response metrics comprising x_score, v_length, and v_delta stored in memory;

(e) sorting the response metrics in memory based on the v_length values of each respective response metric;

(f) analyzing the sorted response metrics using a discontinuity detection algorithm to identify anomalous variations exceeding a predefined threshold;

(g) evaluating the identified anomalous variations using a corpus of models to compute a confidence score indicating a likelihood of adversarial poisoning of the ANN;

(h) determining, based on the evaluation, that the identified anomalous variations are from a poisoned network; and (i) in response to the determination, performing at least one of the following automated mitigation actions:
rejecting one or more perturbed data points;
declining to update a neural model;
logging a warning for users; or
halting a process for accessing ANN vulnerability.

2. The method of claim 1, wherein a determination of whether a poisoning attack was detected is output to a graphical user interface.

3. The method of claim 1, wherein a determination of whether a poisoning attack was detected is output to a feedback control system.

4. A computing system configured to detect poisoning attacks in a trained artificial neural network (ANN), the computing system comprising:

a processor; and a non-transitory computer-readable medium for storing instructions wherein the processor is configured to execute the instructions to:

(a) access the an artificial neural network (ANN) configured to generate inferences based on input data;

(b) select, from an input dataset stored in memory, a plurality of data points representing inputs to the ANN;

(c) for each of the selected data point, generate a random unit vector using a pseudorandom number generator and store the unit vector in memory;

(d) for each data point:

(i) compute a first inference output by applying the data point to the ANN;

(ii) compute a second inference by applying a perturbed version of the data point, formed by adding corresponding unit vector to the ANN;

(iii) calculating, using the first and second inference outputs, a set of ANN response metrics comprising x_score, v_length, and v_delta, stored in memory;

(e) sort the response metrics in memory based on the v_length values of each respective response metric;

(f) analyze the response metrics using a discontinuity detection algorithm to identify anomalous variations exceeding a predefined threshold;

(g) evaluate the identified anomalous variations using a corpus of models to compute a confidence score indicating a likelihood of adversarial poisoning of the ANN;

(h) determine, based on the evaluation, that the identified anomalous variations are from a poisoned network; and (i) in response to the determination, perform at least one the following automated mitigation actions:
reject one or more perturbed data points;
decline to update a neural model;
log a warning for users; or
halt a process for accessing ANN vulnerability.

5. The processor of claim 4, wherein a determination of whether a poisoning attack was detected is output to a graphical user interface.

6. The processor of claim 4, wherein a determination of whether a poisoning attack was detected is output to a feedback control system.

* * * * *